(12) United States Patent
Andelin

(10) Patent No.: US 12,423,714 B2
(45) Date of Patent: Sep. 23, 2025

(54) METHOD AND DEVICE FOR AUTHENTICATING PROVENANCE OF WINES AND SPIRITS

(71) Applicant: Provenance Technology Corporation, Springfield, VA (US)

(72) Inventor: Thomas Nolan Andelin, Springfield, VA (US)

(73) Assignee: Provenance Technology Corporation, Springfield, VA (US)

( * ) Notice: Subject to any disclaimer, the term of this patent is extended or adjusted under 35 U.S.C. 154(b) by 133 days.

(21) Appl. No.: 18/518,169

(22) Filed: Nov. 22, 2023

(65) Prior Publication Data

US 2025/0165991 A1    May 22, 2025

(51) Int. Cl.
*G06Q 30/018* (2023.01)
*G06K 19/07* (2006.01)
*G06K 19/077* (2006.01)

(52) U.S. Cl.
CPC ..... *G06Q 30/0185* (2013.01); *G06K 19/0723* (2013.01); *G06K 19/07722* (2013.01); *G06K 19/07726* (2013.01); *G06K 19/07728* (2013.01); *G06K 19/07798* (2013.01)

(58) Field of Classification Search
CPC .................................... G06Q 40/00
USPC ........................................ 705/35
See application file for complete search history.

(56) References Cited

U.S. PATENT DOCUMENTS

| | | | | |
|---|---|---|---|---|
| 5,297,032 A | * | 3/1994 | Trojan | G06Q 40/04 705/37 |
| 5,761,442 A | * | 6/1998 | Barr | G06Q 40/06 705/36 R |
| 5,812,988 A | * | 9/1998 | Sandretto | G06Q 40/00 702/179 |
| 6,009,402 A | * | 12/1999 | Whitworth | G06Q 40/08 705/400 |
| 6,014,645 A | * | 1/2000 | Cunningham | G06Q 40/00 235/379 |

(Continued)

FOREIGN PATENT DOCUMENTS

| | | |
|---|---|---|
| CN | 108446917 A | 8/2018 |
| CN | 113200212 A | 8/2021 |

(Continued)

OTHER PUBLICATIONS

PCT International Search Report and Written Opinion dated Mar. 13, 2025, issued during the prosecution of PCT-US2024-057035.

(Continued)

*Primary Examiner* — Kirsten S Apple
(74) *Attorney, Agent, or Firm* — Troutman Pepper Locke LLP; Joshua L. Jones; Gabrielle L. Gelozin

(57) ABSTRACT

In accordance with at least one aspect of this disclosure, a system for authenticating bottled goods includes, a near field communication (NFC) inlay having an electronic data component, a communication antenna, and a frangible circuit member configured to permanently alter the electronic data component upon breakage of the frangible circuit member, and a ferrite shield mounted to a second side of the NFC inlay proximate the communication antenna for allowing NFC interactions with the electronic data component through a first side of the NFC inlay opposite the second side of the NFC inlay.

21 Claims, 4 Drawing Sheets

(56) References Cited

U.S. PATENT DOCUMENTS

| | | | | |
|---|---|---|---|---|
| 6,058,379 A * | 5/2000 | Odom | G06Q 40/04 | 705/37 |
| 6,313,833 B1 * | 11/2001 | Knight | G06Q 40/06 | 705/37 |
| 6,345,090 B1 * | 2/2002 | Walker | G06Q 40/04 | 379/114.03 |
| 6,954,758 B1 * | 10/2005 | O'Flaherty | G06Q 30/02 | 707/999.102 |
| 7,165,037 B2 * | 1/2007 | Lazarus | G06Q 30/0269 | 705/7.31 |
| 7,376,431 B2 * | 5/2008 | Niedermeyer | G07C 9/22 | 379/189 |
| 8,104,678 B2 * | 1/2012 | Yoshikawa | G06Q 20/4037 | 235/492 |
| RE43,435 E * | 5/2012 | Krause | G06Q 40/06 | 705/37 |
| 8,219,482 B2 * | 7/2012 | Neri | G06Q 40/04 | 705/37 |
| 8,234,201 B1 * | 7/2012 | Canabarro | G06Q 40/06 | 705/36 R |
| 8,412,605 B2 * | 4/2013 | Griffin | G06Q 40/02 | 705/76 |
| 8,452,681 B2 * | 5/2013 | Clements | G06Q 40/04 | 705/37 |
| 8,825,456 B2 * | 9/2014 | Vasudevan | G06T 7/521 | 703/2 |
| 9,176,789 B2 * | 11/2015 | Lowes | G06F 9/5083 | |
| 9,760,910 B1 * | 9/2017 | Tuchman | G06Q 50/01 | |
| 10,958,211 B1 * | 3/2021 | Sarwat | H02J 3/004 | |
| 10,977,110 B2 * | 4/2021 | Matei | G06N 5/01 | |
| 11,516,014 B2 | 11/2022 | Walker | | |
| 11,542,080 B2 | 1/2023 | Gaines et al. | | |
| 2002/0161677 A1 * | 10/2002 | Zumbach | G06Q 40/00 | 707/E17.001 |
| 2002/0184134 A1 * | 12/2002 | Olsen | G06Q 40/06 | 705/37 |
| 2003/0149648 A1 * | 8/2003 | Olsen | G06Q 40/00 | 705/35 |
| 2005/0187854 A1 * | 8/2005 | Cutler | G06Q 40/04 | 705/37 |
| 2005/0192899 A1 * | 9/2005 | Reardon | G06Q 40/00 | 705/40 |
| 2006/0195391 A1 * | 8/2006 | Stanelle | G06Q 40/02 | 705/38 |
| 2007/0244795 A1 * | 10/2007 | Lutnick | G06Q 40/04 | 705/37 |
| 2008/0255910 A1 * | 10/2008 | Bagchi | G06Q 10/0635 | 705/7.28 |
| 2008/0288326 A1 * | 11/2008 | Abramowicz | G06Q 30/0605 | 705/7.29 |
| 2008/0288889 A1 * | 11/2008 | Hunt | G06Q 30/02 | 715/810 |
| 2008/0301019 A1 * | 12/2008 | Monk | G06Q 20/4016 | 705/35 |
| 2009/0024539 A1 * | 1/2009 | Decker | G06Q 40/06 | 705/36 R |
| 2010/0023460 A1 * | 1/2010 | Hughes | G06Q 40/06 | 705/36 R |
| 2010/0312701 A1 * | 12/2010 | Bosch | G07F 19/20 | 705/43 |
| 2011/0145149 A1 * | 6/2011 | Valdes | G06Q 20/10 | 705/44 |
| 2011/0178912 A1 * | 7/2011 | Parsons | G06Q 40/04 | 705/35 |
| 2011/0213731 A1 * | 9/2011 | Cho | G06Q 50/16 | 705/36 R |
| 2011/0264581 A1 * | 10/2011 | Clyne | G06Q 20/10 | 705/39 |
| 2012/0029956 A1 * | 2/2012 | Ghosh | G06Q 10/063 | 705/7.11 |
| 2012/0030154 A1 * | 2/2012 | Nicholson | G01S 7/003 | 703/2 |
| 2012/0278254 A1 * | 11/2012 | Rosenthal | G06Q 40/06 | 705/36 R |
| 2012/0323764 A1 * | 12/2012 | Boberski | G06Q 40/04 | 705/39 |
| 2013/0024395 A1 * | 1/2013 | Clark | G06Q 40/06 | 705/36 R |
| 2013/0226764 A1 * | 8/2013 | Battyani | G06Q 40/04 | 705/37 |
| 2014/0156491 A1 * | 6/2014 | Koh | G06Q 40/04 | 705/37 |
| 2014/0229353 A1 * | 8/2014 | Lutnick | G06Q 40/04 | 705/37 |
| 2015/0011962 A1 * | 1/2015 | Roura Fernandez | A61J 1/18 | 604/404 |
| 2015/0108221 A1 * | 4/2015 | Akamatsu | H01Q 1/2225 | 235/488 |
| 2015/0154284 A1 * | 6/2015 | Pfeifer | G06F 16/3344 | 707/723 |
| 2016/0172742 A1 * | 6/2016 | Forster | H01Q 1/38 | 343/878 |
| 2016/0314425 A1 * | 10/2016 | Cunningham | G06Q 10/06398 | |
| 2016/0371779 A1 * | 12/2016 | Stearns | G06Q 40/06 | |
| 2018/0047071 A1 * | 2/2018 | Hsu | G06Q 30/0282 | |
| 2018/0276522 A1 | 9/2018 | Coronado | | |
| 2019/0260573 A1 | 8/2019 | Goto | | |
| 2019/0318348 A1 * | 10/2019 | Brenner | G06Q 20/1235 | |
| 2019/0322426 A1 | 10/2019 | Verma et al. | | |
| 2019/0370716 A1 * | 12/2019 | Kavumpurath | G06F 16/2458 | |
| 2019/0379642 A1 * | 12/2019 | Simons | H04L 63/0281 | |
| 2020/0019288 A1 * | 1/2020 | D'Amore | H04L 9/3239 | |
| 2020/0143367 A1 * | 5/2020 | LeBeau | G06F 21/64 | |
| 2020/0175623 A1 * | 6/2020 | Howie | G06Q 50/18 | |
| 2020/0267163 A1 * | 8/2020 | Wilson | H04L 9/3271 | |
| 2021/0110477 A1 * | 4/2021 | Spangenberg | G06Q 20/36 | |
| 2021/0264520 A1 * | 8/2021 | Cummings | G06Q 40/12 | |
| 2021/0284406 A1 | 9/2021 | McDonald | | |
| 2021/0342662 A1 | 11/2021 | Balgañón Canela et al. | | |
| 2022/0058735 A1 * | 2/2022 | Chuzhoy | G06Q 40/04 | |
| 2022/0084043 A1 | 3/2022 | Mickel et al. | | |
| 2022/0129980 A1 * | 4/2022 | Son | H04L 9/3239 | |
| 2022/0309475 A1 * | 9/2022 | Kurniawan | G06F 16/248 | |
| 2022/0414726 A1 * | 12/2022 | Kerber | H04L 9/50 | |
| 2023/0116345 A1 * | 4/2023 | Chirochangu | G06Q 10/0635 | 705/7.28 |
| 2023/0281604 A1 * | 9/2023 | Robell | G06Q 30/018 | |
| 2023/0298117 A1 * | 9/2023 | Barlow | G06Q 50/26 | 705/41 |
| 2023/0419315 A1 * | 12/2023 | Togame | G06Q 30/06 | |
| 2024/0106667 A1 * | 3/2024 | Batcher | G06Q 40/06 | |

FOREIGN PATENT DOCUMENTS

| | | |
|---|---|---|
| CN | 113362013 A | 9/2021 |
| CN | 113955289 A | 1/2022 |
| EP | 3574842 A2 | 12/2019 |
| EP | 3671674 A1 | 6/2020 |
| JP | 2022542921 A | 10/2022 |
| WO | 2018197064 A1 | 11/2018 |
| WO | 2021046609 A1 | 3/2021 |

OTHER PUBLICATIONS

Neo C.K. Yiu, "An NFC-Enabled Anti-Counterfeiting System for Wine Industry". Dept. of Industrial and Manufacturing Systems Engineering, The University of Hong Kong, 32 pages.

* cited by examiner

METHOD AND DEVICE FOR AUTHENTICATING PROVENANCE OF WINES AND SPIRITS

BACKGROUND

1. Field

The present disclosure relates to authenticating provenance of bottled products, and more particularly to utilizing blockchain techniques for anti-counterfeiting of valuable bottled goods such as alcoholic beverages, including at points of first sale and in secondary markets.

2. Description of Related Art

Bottled products such as wines, spirits, and the like can vary considerably in value based on factors such as vintage, age, and bottler. As a given make of a given product is consumed, the surviving supply diminishes, leading to a per bottle appreciation. The appreciation can rise to a price feasible for consumption only by connoisseurs. Owners of rarified bottled products may choose not to consume a given bottle, but rather to bank it for its investment value, hoping for a future sale at an appreciated price. A valuable bottle may change hands many times over years and decades before it is finally consumed.

Counterfeiters have exploited the system. For example, a counterfeiter can obtain discarded bottles of a valuable product, refill the bottles with a counterfeit beverage, and pass this off as the authentic good. In the past, experts were needed to help authenticate valuable products. However, the use of experts is costly and may not always settle an issue. Moreover, using an expert typically requires opening the bottle, ending the transactional value of the bottle.

The conventional techniques have been considered satisfactory for their intended purpose. However, there is an ever-present need for improved systems and methods for ensuring authenticity of bottled goods. This disclosure provides a solution for this need.

SUMMARY

In accordance with at least one aspect of this disclosure, a system for authenticating bottled goods includes, a near field communication (NFC) inlay having an electronic data component, a communication antenna, and a frangible circuit member configured to permanently alter the electronic data component upon breakage of the frangible circuit member, and a ferrite shield mounted to a second side of the NFC inlay proximate the communication antenna for allowing NFC interactions with the electronic data component through a first side of the NFC inlay opposite the second side of the NFC inlay.

The system can further include, a first liner mounted to a first side of the NFC inlay, and a second liner mounted to the second side of the NFC inlay opposite the first liner. The system can further include, a transfer mat directly contacting the first side of the NFC inlay and a first adhesive layer adhering the first liner to the transfer mat. The ferrite shield can be mounted directly to a first area of the second side of the NFC inlay. A second adhesive layer can be included, adhering the second liner to the ferrite shield and a second area of the second side of the NFC inlay.

The system can include a polymer capsule configured to be disposed over a metal capsule that is configured to cover a bottle opening. The polymer capsule can include, an inner capsule body defining a capsule axis and a receptacle opening and an end surface opposite the receptacle opening, wherein a sidewall of the inner capsule body connects the end surface to the receptacle opening. The polymer capsule can also include an outer capsule body disposed about the end surface and sidewall of the inner capsule body. The ferrite shield and first area of the second side of the NFC inlay can be positioned on the end surface of the inner capsule body between the inner capsule body and the outer capsule body with the ferrite shield being closer to the bottle top receptacle opening than the communication antenna.

The frangible circuit member extends axially along the sidewall of the inner capsule body, between the inner capsule body and the outer capsule body. The system can also include an RFID (radio frequency identification) component between the inner capsule body and the outer capsule body. The RFID component can extend around a first circumferential portion of the sidewall of the inner capsule body, within an axial length of the frangible circuit member but non-overlapping with the frangible circuit member circumferentially.

In embodiments, the system can include a bottle with liquid contents therein, a stopper sealing an opening of the bottle, and the metal capsule disposed over the stopper and a neck portion of the bottle, such that opening the metal capsule to access the stopper and liquid contents requires breaking the frangible circuit member.

In accordance with at least one aspect of this disclosure, a method is disclosed. In certain embodiments, and authentication system configured to execute machine readable instructions on one or more devices to cause the one or more devices to perform the method.

The method can include, requesting a unique blockchain hash for a capsule for preserving provenance of a bottle of product; and receiving the unique blockchain hash, and associating an NFC inlay of the capsule with the unique blockchain hash, by associating the unique blockchain hash with an NFT (non-fungible token) unique to the NFC.

The method can further include, receiving a product verification request signal from a producer of bottled products indicating creation of a bottle of product and mounting of the capsule to the bottle, verifying correlation of the NFT and NFC inlay, and issuing a product verification signal upon verifying correlation of the NFT and NFC inlay or issuing an error message upon failure to correlate the NFT and the NFC inlay.

In embodiments, the method can further include, receiving a consumer request for verification of the bottle of product bearing the NFC inlay, sending a query to a block chain to verify a match between the NFT and NFC inlay to a valid unique blockchain hash, and issuing a consumer verification response to the consumer. The consumer verification response can affirm authenticity of the bottle of product to the consumer if the NFT and NFC inlay are a valid match to the unique blockchain hash, and the consumer verification response can indicate inauthenticity of the bottle of product to the consumer otherwise.

The method can further include, appending to a ledger entry associated with the unique blockchain hash upon receiving the consumer request for verification of the bottle of product. Appending to the ledger entry can include appending to the ledger entry geographic location corresponding to location from which the consumer request for verification is received, time of receipt of the consumer request for verification.

The method can further include, receiving a signal indicative of breaking a frangible disconnect of a physical system for authenticating bottled goods, and permanently editing the ledger entry associated with the unique blockchain hash to indicate consumption of the bottle of product.

In embodiments, the method can include, receiving a request for commercial verification from a commercial actor, and issuing a commercial verification response to the commercial actor. The commercial verification response can affirm the authenticity of the bottle of product to the commercial actor if the request for commercial verification includes a valid match to the unique blockchain hash, and the commercial verification response can indicate inauthenticity of the bottle of product to the commercial actor if the request for commercial verification fails to include a valid match to the unique blockchain hash.

The method can further include, appending to a ledger entry associated with the unique blockchain hash upon receiving the request for commercial verification. Appending to the ledger entry can include appending to the ledger entry geographic location corresponding to location from which the request for commercial verification is received, time of receipt of the request for commercial verification.

The method can further include, receiving a signal indicative of breaking a frangible disconnect of a physical system for authenticating bottled goods, and permanently editing the ledger entry associated with the unique blockchain hash to indicate consumption of the bottle of product.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
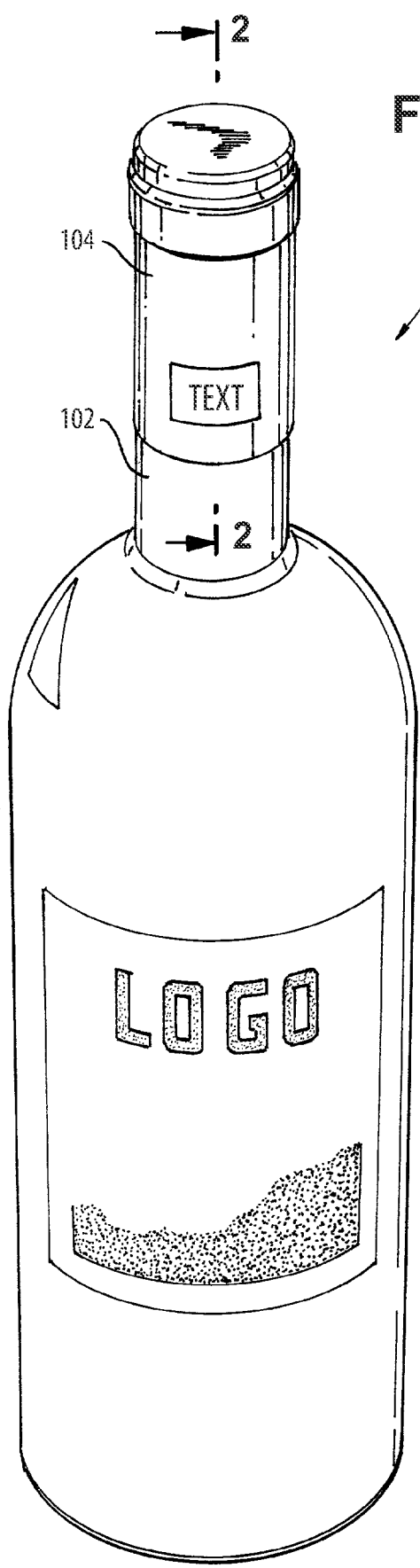
FIG. 1 shows an embodiment of a system constructed in accordance with the present disclosure, showing an authentication system for authenticating bottled goods installed on a bottle.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used to authenticate provenance of bottled goods.

In accordance with at least one aspect of this disclosure, a system 100 for authenticating bottled goods 102 is disclosed. The bottled goods 102 can include a bottled product in which authenticating provenance of the bottled product is desired, such as wine or other sprits. Though the system and methods described herein may be described with respect to authenticating provenance of bottled wine, one having ordinary skill in the art in view of this disclosure would readily appreciate that the systems and methods described herein can be applicable to other sprits or aged bottles.

Figure 2:
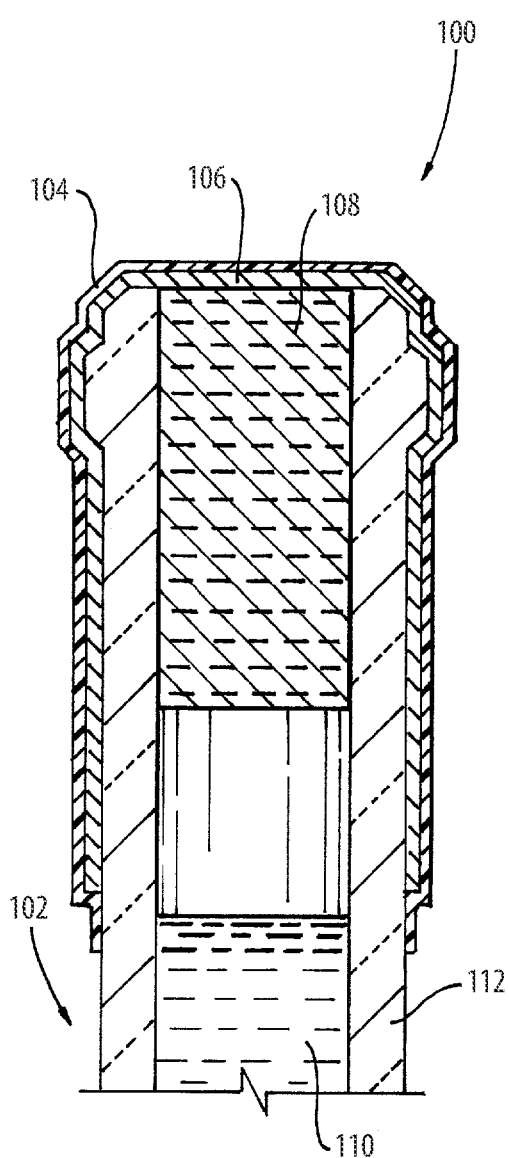
FIG. 2 is a schematic cross-sectional view of the bottle shown in FIG. 1 taken along section 2.

As shown in FIGS. 1 and 2, the system 100 can include a capsule 104 for placing over a bottlers existing tamper capsule 106, often a thin metal or foil capsule used as a tamper indicator. The capsule 104 as described herein is placed over top of the bottlers seal 106 and can include its own distinct indicia, which can serve as a first, visual indication of the authenticity of provenance.

Figure 3:
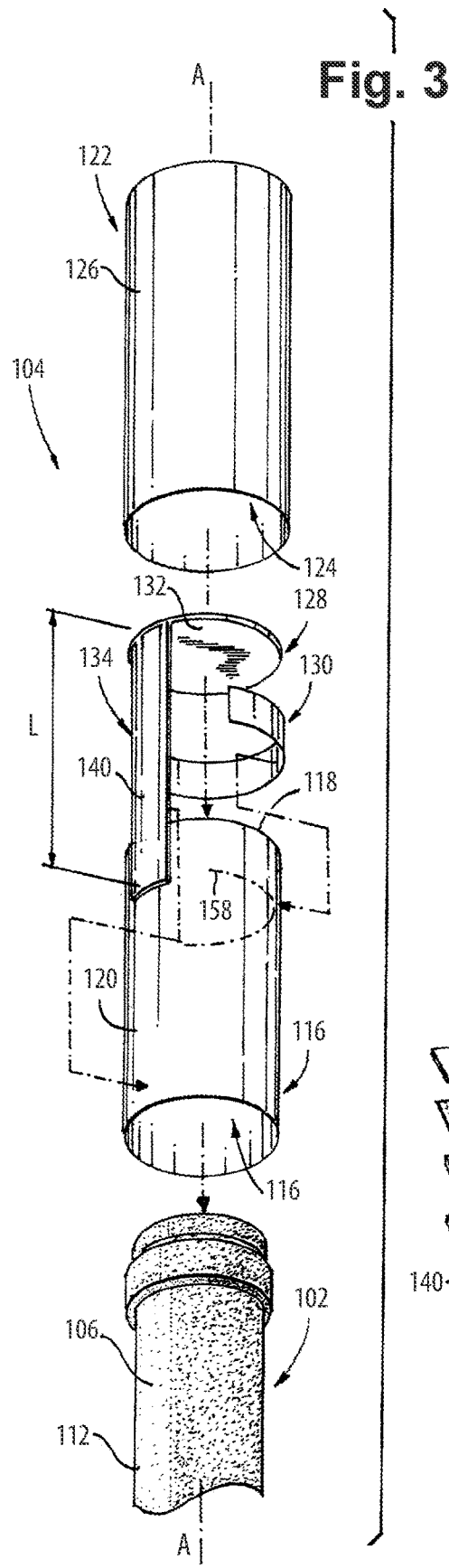
FIG. 3 is an upward looking exploded perspective view of the bottle and authentication system of FIG. 1, showing an exploded view of an authentication capsule, and the capsule shown exploded from the bottle.

Referring now to FIGS. 2-5, the capsule and its contents are described. FIG. 2 shows a cross sectional view of the bottle of FIG. 1 taken along section 2, showing a bottle stopper 108 (e.g., a cork, screw top or other bottle stopper) within the bottle 102 sealing the liquid contents 110 within the bottle 102, the bottler's metal tamper capsule 106 disposed over the bottle neck 112, and the authenticator capsule 104 disposed over the metal tamper capsule 106. Shown in FIG. 3 is an exploded view of the authenticator capsule 104, shown exploded above the bottle neck 112, while the bottler's metal capsule 106 is shown on the bottle neck 112. The capsule 104, which can be of a polymer material (e.g., polyethylene terephthalate (PET)) includes, an inner capsule body 114 defining a capsule axis A, a receptacle opening 116 and an end surface 118 opposite the receptacle opening 116. A sidewall 120 of the inner capsule body 114 connects the end surface 118 to the receptacle opening 116.

Figure 4:
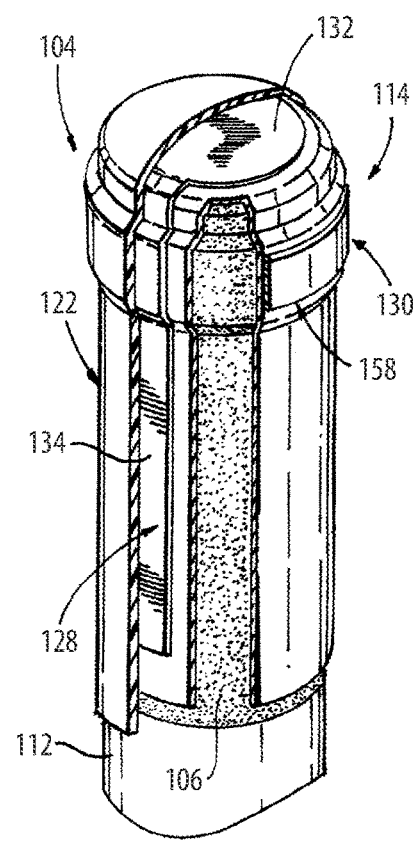
FIG. 4 is a downward looking perspective view of the bottle and authentication system of FIG. 1, showing a relative placement of one or more components within the authentication capsule with the authentication capsule shown installed on the bottle.

The polymer capsule 104 can also include an outer capsule body 122 disposed about the end surface 118 and sidewall 120 of the inner capsule body 114. A small space 124 is formed between the sidewall 120 of the inner capsule 114 and a sidewall 126 of the outer capsule 122 to house a portion the authentication system 100, which includes a near field communication (NFC) component 128 and an RFID (radio frequency identification) component 130, where both the NFC component 128 and the RFID component 130 are disposed between the inner capsule body 114 and the outer capsule body 122. FIG. 4 shows a breakaway view of the capsule 104 disposed over the bottle neck 112, showing the relative placement of the capsule 104, the NFC component 128, the RFID component 130, and the bottlers metal capsule 106 on the bottle neck 112. The capsule 104 can be heat shrunk onto the bottle neck 112 to arrive at the configuration shown in FIG. 4.

The NFC component 128 can include a first portion 132 and a second portion 134. When installed in the capsule 104, the first portion 132 can be positioned on the end surface 118 of the inner capsule body 114 between the inner capsule body 114 and the outer capsule body 122. The second portion 134 extends axially along the sidewall 120 of the inner capsule body 114 (e.g., along the capsule axis A), between the inner capsule body 114 and the outer capsule body 122.

Figure 5:
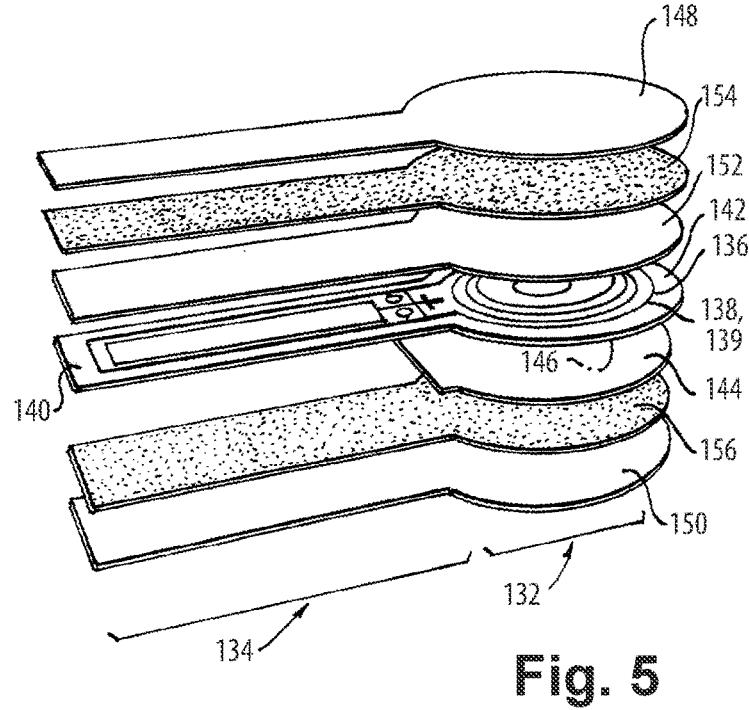
FIG. 5 is an exploded perspective view of an NFC component of the authentication capsule.

Referring now to FIG. 5, the NFC component 128 can include an NFC inlay 136 an electronic data component 138, a communication antenna 139, and a frangible circuit member 140. The frangible circuit member 140 can be configured to permanently alter the electronic data component 138 (e.g., alter a bit string of the electronic data component 138) upon breakage of the frangible circuit member 140. The electronic data component 138 can be disposed in a first side 142 of the NFC inlay 136 and a ferrite shield 144 is mounted to a second side 146 of the NFC inlay 136 (opposite the first side 142) proximate the communication antenna 139 for allowing NFC interactions with the electronic data component 138 through the first side 142 of the NFC inlay 136. Despite nearby metal (e.g., the capsule 106), the inlay 136 is configured for operability with the at least one liner mounted to a metallic substrate. Since the ferrite shield is disposed in the first portion 132 of the NFC component 128, when the NFC component is installed in the capsule 104, the ferrite shield 144 will be proximate to the bottle top and the top of the bottler's metal capsule 106. The ferrite shield 144 is positioned between the communication antenna 139 and the metal capsule 106. Accordingly, the ferrite shield 144 prevents communication interference between the antenna 139 and the bottler's metal capsule 106 when a user uses an NFC reader to interact with the NFC component 128.

With continued reference to FIG. 5, a first liner 148 can be mounted to the first side 142 of the NFC inlay 136, and a second liner 150 can be mounted to the second side 146 of the NFC inlay 136 opposite the first liner 148. In embodiments, the first and second liners 148, 150 can include an electrical insulator material. A transfer mat 152 can be included, directly contacting the first side 142 of the NFC inlay 136 (e.g., where no components are included between the transfer mat 152 and the first side 142 of the inlay 136). A first adhesive layer 154 can adhere the first liner 148 to the transfer mat 152. The ferrite shield 144 can be mounted directly (e.g., without any intervening layers) to a first area (e.g., only in the first portion 132) of the second side of the NFC inlay 136. A second adhesive layer 156 can be included, adhering the second liner 150 to the ferrite shield 144 and a second area (e.g., the second portion 134) of the second side 146 of the NFC inlay 136.

Again referencing FIGS. 3 and 4, The RFID component 130 can extend around a first circumferential portion 158 of the sidewall 120 of the inner capsule body 114, within an axial length L of the frangible circuit member 140 but non-overlapping with the frangible circuit member 140 circumferentially, for example, the RFIF component 130 can span about 270° of the bottle neck 112. This configuration of the NFC component 128 and RFID component 130 within the capsule 104 thus requires breaking the frangible circuit member 140 in order to access the tamper foil 106 to be able to remove the stopper 108 and access the liquid contents 110. Accordingly, when the bottle 102 is opened or the capsule 104 is otherwise removed from the bottle 102, the bitstring of the electronic data component 138 is permanently altered so as to indicate to a subsequent owner of the bottle loss of provenance of the bottle contents 110.

Figure 6:
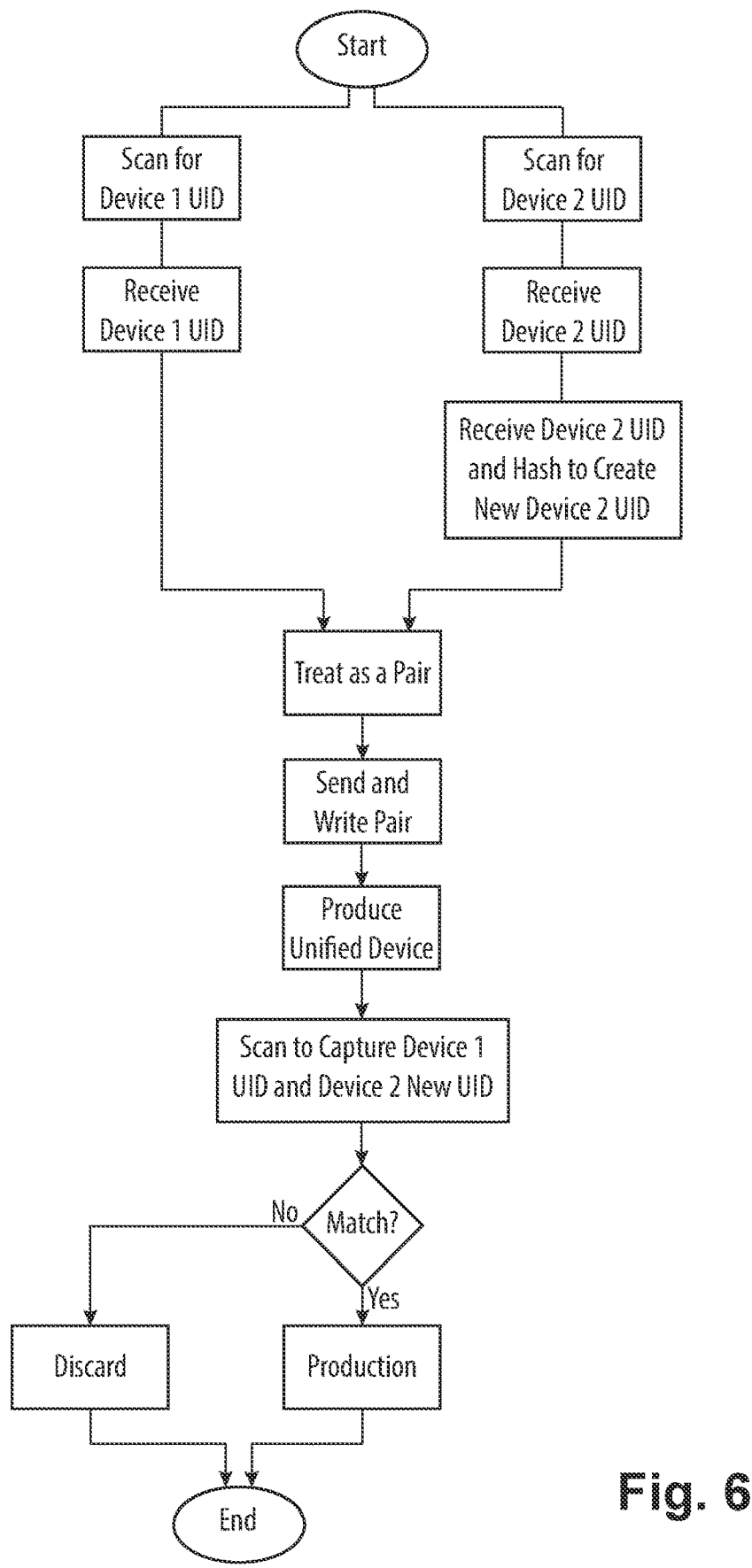
FIG. 6 is a flow chart showing a method for creating a unified device for use in an authentication method.
Figure 7:
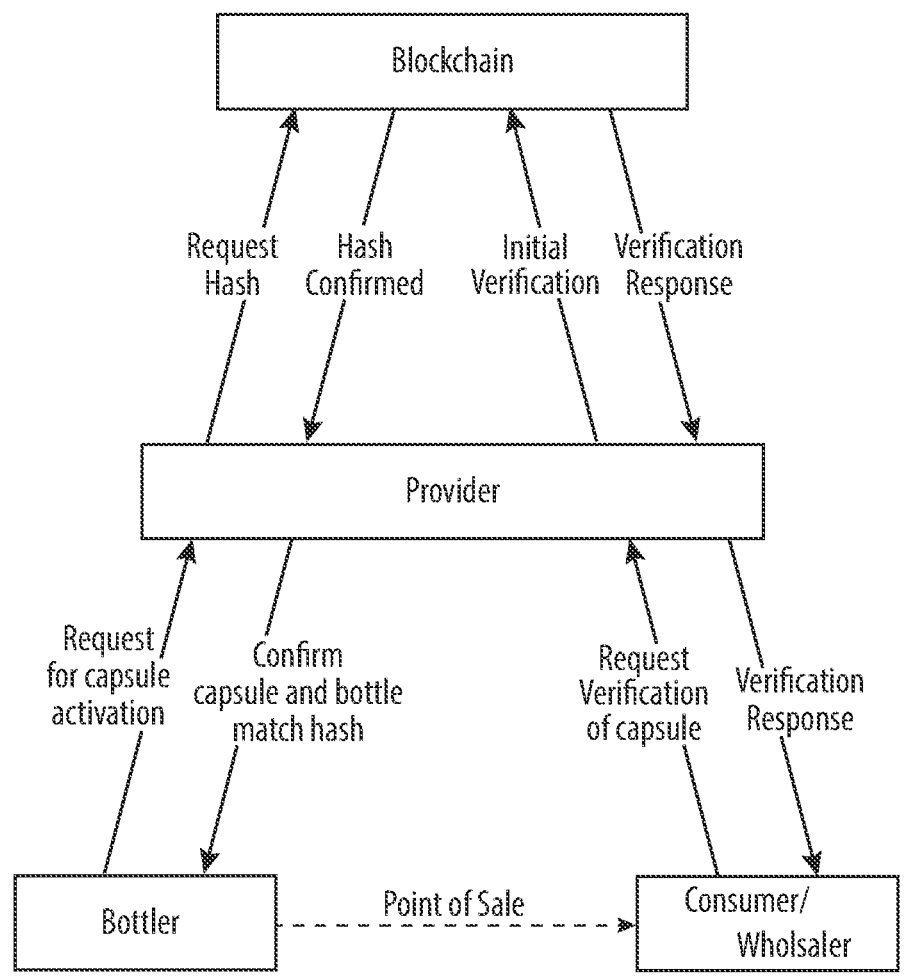
FIG. 7 is a flow chart showing another portion of the authentication method.

Referring now to FIGS. 6 and 7, in accordance with at least one aspect of this disclosure, a method is described, for example, a method of authenticating provenance of the bottle and its contents. In certain embodiments, an authentication system can be configured to execute machine readable instructions on one or more devices to cause the one or more devices to perform the method described. The one or more devices can include, a server, a personal electronic device (PED), and a device configured for scanning one or more of an NFC component or an RFID component. One or more of the PED and/or the scanning device can be configured for communication with the server.

The method can begin, as shown in FIG. 6, with a provider generating a unified device, e.g., the NFC component 128 (e.g., as described above) and the RFID component 130 (e.g., as described above) together, and associating the unified device with a unique blockchain hash requested from a blockchain platform (e.g., the Solana blockchain platform of Solana Labs & Solana Foundation of San Francisco, CA or the like). As shown, the provider must first associate the NFC component 128 and RFID component 130 with one another, and with the unique hash. To do so, the provider will scan the RFID component 130 for its unique identifier (Device 1 UID) and receives the Device 1 UID. The provider also scans the NFC component 128 for its UID (Device 2 UID) and at the same time associates the unique blockchain hash with the NFC component 128. The unique blockchain hash is requested from the blockchain platform and the blockchain platform then creates the unique blockchain hash (e.g., a non-fungible token (NFT)) and creates a leger entry with a unique address for the unique blockchain hash. This action gives the provider a NEW unique identifier (NEW Device 2 UID) for the NFC component 128, which comprises the original Device 2 UID plus the unique blockchain hash.

The two components can then be treated as a pair, and the pair can be written to a provider database to produce a "unified device," which includes the RFID component 130 and NFC component 128 as a pair, and both of which are associated with the unique blockchain hash, and ultimately the bottle or lot on which the capsule 104 is installed.

During production of the bottle of product, the product is bottled, and the bottler installs the stopper 108 and installs the metal capsule 106 over the bottle neck 112 to seal the product 110 therein. Then, the bottler can scan the RFID component 130 and send a request to the system 100 to begin the authentication process at the producer level with the wine/spirit producer and/or the bottler. Once the product bottling procedure is complete, the method can include, at the server, receiving a product verification request signal from the producer indicating creation of a bottle of product, e.g. triggered by the bottler's system scanning the RFID component 130 during production of the bottle/capsule assembly. During the request process, the producer can also request the provider to tag the respective NFT with metadata specific to the bottle or the lot, for example, a vintage or a bottling year, a name of the product, a lot number, a bottling or growth location, or the like, which becomes permanently associated with the capsule via the NFT leger entry.

The request from the bottler to the provider can be generated by the bottler/producer scanning either the NFC component 128 or the RFID component 130 as part of the process of placing the respective capsule on the respective bottle. The system 100 then verifies correlation of the NFT and NFC/RFID and then issues a product verification signal back to the bottler upon verifying correlation of the NFT and NFC/RFID. If there is a mismatch between the NFC and the NFT, the RFID and the NFT, or the NFC and the RFID, the provider/system 100 issues an error message to the bottler upon failure to correlate the NFT and the NFC/RFID, and the capsule should be discarded and the NFT is "burned."

After the capsule 104 is mounted to the bottle 102, the provider/system 100 has associated the NFT with the respective capsule and bottle, and verified the associated between the NFT and the NFC/RFID, the bottle can then be sold in the typical manner, e.g., business to business (bottler to wholesaler/retailer) or business to consumer (e.g., direct to consumer). As described further below, and with respect to FIG. 7, the method can include authenticating the bottle's provenance in response to requests from downstream requesters, such as retailers, wholesalers, or consumers. The capsule 104 also allows for the tracking of ownership within the metadata of the capsule as the bottle changes hands, as described further below.

After the bottler has sold a bottle or lot of bottles, the subsequent merchants can scan RFID or NFC, which a merchant's system uses to request verification from the provider/system 100. The provider/system 100 sends back an affirmative response if the frangible member is intact in the case of NFC scanning, and is listed as intact in the blockchain ledger in the case of RFID scanning. Otherwise, the system 100 can send a response to the merchant that the provenance on the bottle is compromised.

When a consumer intends to purchase the bottle for consumption or collection the authentication method can include receiving a consumer request for verification of the bottle of product bearing the NFC inlay 136 and RFID 130. The request from the consumer can be made by scanning NFC component 128 with an electronic device, such as a personal electronic device for example. The scanning device can be a personal electronic device, or can be another NFC capable device, where the scanning device is configured for communication with the provider (e.g., the server) to make the request for verification. The request for verification can be done through device itself, or through an app on the device, for example. Consumer actors may be more likely to use NFC capable devices such as a mobile device.

Upon receiving the request, the provider (the system 100 or server) can then send a query to a blockchain to verify a match between the NFT and NFC inlay 136 to the valid unique blockchain hash. The provider then receives the response from the blockchain and issues a consumer verification response to the consumer via the electronic device. In embodiments, this can be done through an app on a personal electronic device, for example.

The consumer verification response can the affirm authenticity of the bottle of product to the consumer if the NFT and NFC inlay/RFID component are a valid match to the unique blockchain hash. The consumer verification response can indicate inauthenticity of the bottle of product to the consumer otherwise, for example, if the NFT and NFC inlay/RFID component do not match the blockchain hash. Because opening the bottle requires breakage of the NFC frangible circuit member, opening the bottle this permanently alters the bitstring of the NFC electronic data component, for example, flipping one or more bits of the string. When a consumer scans the NFC device 128 after the frangible member is broken, the providers application (app) on the consumer's device signals the NFC bitstring to the system 100, which permanently appends the ledger to indicate the bottles' provenance is compromised (if not previously so appended) and signals back to the consumer's device indicating the bottle's provenance is compromised. Accordingly, the mismatch indicates to the consumer that the bottle has been opened and the product therein may not be authentic. Thus, if the consumer receives a verification response indicating a valid NFT and no breakage of the frangible member, the bottle is guaranteed to be unopened and authentic. If there is a mismatch, the bottle is not guaranteed to have never been previously opened, indicating the provenance of the bottle is lost.

When the NFC inlay is associated with the NFT, a ledger entry is added to the blockchain leger containing the metadata associated with the capsule having that particular NFC inlay provided by the bottler. Once the bottle is scanned by a subsequent actor, the authentication method can further include, appending to the original ledger entry associated with the unique blockchain hash additional metadata relating to the subsequent scan, for example, the leger entry can be appended to include geographic location corresponding to location from which the consumer request for verification is received, time of receipt of the consumer request for verification, identity of the consumer making the request, or any other information desired by the provider that may add value to the bottle. This allows for secure tracking of the bottle throughout its life.

After the consumer has consumed the beverage, a counterfeiter may attempt to reuse the bottle and capsule to sell a counterfeit. If so, the authentication method can further include, receiving a signal from a second consumer's device scanning the NFC device (now with the bistring permanently altered), indicative of a broken a frangible disconnect (e.g., frangible circuit member 140) of the NFC inlay. Since the blockchain ledger has been permanently edited the second consumer's NFC scan causes the provider's app on the personal device to detect the burned NFT in the leger indicating that the bottle has been opened and has thus been consumed or may no longer be authentic. The provider/system 100 sends a message back to the second consumer's device, indicating to the user that the bottle does not have authentic provenance. The second consumer can thereby detect and avoid purchasing a counterfeit.

The authentication method can operate in a similar manner when the initial request is made by a commercial actor (e.g., a wholesaler or retailer). Here the authentication method can include receiving a request for commercial verification from the commercial actor. The commercial actor may be more likely to use a device configured for RFID scanning as RFID scanning allows for scanning at farther distance and scanning large quantities at a single scan, for example, scanning an entire pallet with a single scan. The scanning device can also be a personal electronic device, or can be another RFID capable device, where the scanning device is configured for communication with the provider (e.g., the server) to make the request for verification. The request for verification can be done through device itself, or though an app on the device, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein. Embodiments include an authentication system configured to execute machine readable instructions on one or more devices to cause the one or more devices to perform a method. The computer program/machine readable instructions can include analog or digital logic or a combination of digital and analog logic configured for performing the methods described herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The methods and systems of the present disclosure, as described above and shown in the drawings, provide for improved systems and methods of authenticating provenance of bottled product as well as tracking ownership of bottled products. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for authenticating bottled goods comprising:
a near field communication (NFC) inlay having an electronic data component, a communication antenna, and a frangible circuit member configured to permanently alter the electronic data component upon breakage of the frangible circuit member; and
a ferrite shield mounted to a second side of the NFC inlay proximate the communication antenna for allowing NFC interactions with the electronic data component through a first side of the NFC inlay opposite the second side of the NFC inlay.

2. The system as recited in claim 1, further comprising:
a first liner mounted to a first side of the NFC inlay; and
a second liner mounted to the second side of the NFC inlay opposite the first liner.

3. The system as recited in claim 1, further comprising:
a transfer mat directly contacting the first side of the NFC inlay;
a first adhesive layer adhering the first liner to the transfer mat;
wherein the ferrite shield is mounted directly to a first area of the second side of the NFC inlay; and
a second adhesive layer adhering the second liner to the ferrite shield and a second area of the second side of the NFC inlay.

4. The system as recited in claim 3, further comprising a polymer capsule configured to be disposed over a metal capsule that is configured to cover a bottle opening, wherein the polymer capsule includes:
an inner capsule body defining a capsule axis and a receptacle opening and an end surface opposite the receptacle opening, wherein a sidewall of the inner capsule body connects the end surface to the receptacle opening; and
an outer capsule body disposed about the end surface and sidewall of the inner capsule body, wherein the ferrite shield and first area of the second side of the NFC inlay are positioned on the end surface of the inner capsule body between the inner capsule body and the outer capsule body with the ferrite shield being closer to the bottle top receptacle opening than the communication antenna.

5. The system as recited in claim 4, wherein the frangible circuit member extends axially along the sidewall of the inner capsule body, between the inner capsule body and the outer capsule body, and further comprising:
an RFID (radio frequency identification) component between the inner capsule body and the outer capsule body, the RFID component extending around a first circumferential portion of the sidewall of the inner capsule body, within an axial length of the frangible circuit member but non-overlapping with the frangible circuit member circumferentially.

6. The system as recited in claim 5, further comprising:
a bottle with liquid contents therein;
a stopper sealing an opening of the bottle; and
the metal capsule disposed over the stopper and a neck portion of the bottle, such that opening the metal capsule to access the stopper and liquid contents requires breaking the frangible circuit member.

7. A method comprising:
requesting a unique blockchain hash for a capsule for preserving provenance of a bottle of product; and
receiving the unique blockchain hash, and associating an NFC inlay of the capsule with the unique blockchain hash, by associating the unique blockchain hash with an NFT (non- fungible token) unique to the NFC.

8. The method as recited in claim 7, further comprising:
receiving a product verification request signal from a producer of bottled products indicating creation of a bottle of product and mounting of the capsule to the bottle;
verifying correlation of the NFT and NFC inlay; and
issuing a product verification signal upon verifying correlation of the NFT and NFC inlay or issuing an error message upon failure to correlate the NFT and the NFC inlay.

9. The method as recited in claim 8, further comprising:
receiving a consumer request for verification of the bottle of product bearing the NFC inlay;
sending a query to a block chain to verify a match between the NFT and NFC inlay to a valid unique blockchain hash; and
issuing a consumer verification response to the consumer, wherein the consumer verification response affirms authenticity of the bottle of product to the consumer if the NFT and NFC inlay are a valid match to the unique blockchain hash, and wherein the consumer verification response indicates inauthenticity of the bottle of product to the consumer otherwise.

10. The method as recited in claim 9, further comprising appending to a ledger entry associated with the unique blockchain hash upon receiving the consumer request for verification of the bottle of product.

11. The method as recited in claim 10, wherein appending to the ledger entry includes appending to the ledger entry geographic location corresponding to location from which the consumer request for verification is received, time of receipt of the consumer request for verification.

12. The method as recited in claim 11, further comprising:
receiving a signal indicative of breaking a frangible disconnect of a physical system for authenticating bottled goods; and permanently editing the ledger entry associated with the unique blockchain hash to indicate consumption of the bottle of product.

13. The method as recited in claim 8, further comprising:
receiving a request for commercial verification from a commercial actor; and
issuing a commercial verification response to the commercial actor, wherein the commercial verification response affirms the authenticity of the bottle of product to the commercial actor if the request for commercial verification includes a valid match to the unique blockchain hash, and wherein the commercial verification response indicates inauthenticity of the bottle of product to the commercial actor if the request for commercial verification fails to include a valid match to the unique blockchain hash.

14. The method as recited in claim 13, further comprising appending to a ledger entry associated with the unique blockchain hash upon receiving the request for commercial verification.

15. The method as recited in claim 14, wherein appending to the ledger entry includes appending to the ledger entry geographic location corresponding to location from which the request for commercial verification is received, time of receipt of the request for commercial verification.

16. An authentication system configured to execute machine readable instructions on one or more devices to cause the one or more devices to perform a method, the method comprising:
   requesting a unique blockchain hash for a capsule for preserving provenance of a bottle of product in response to receiving the product verification signal; and
   receiving the unique blockchain hash and associating an NFC inlay of the capsule with the unique blockchain hash, by associating the unique blockchain hash with an NFT (non-fungible token) unique to the NFC inlay.

17. The system as reciting in claim 16, wherein the method further includes:
   receiving a product verification request signal from a producer of bottled products indicating creation of a bottle of product and mounting of the capsule to the bottle;
   verifying correlation of the NFT and NFC inlay; and
   issuing a product verification signal upon verifying correlation of the NFT and NFC inlay or issuing an error message upon failure to correlate the NFT and the NFC inlay.

18. The system as reciting in claim 17, wherein the method further includes:
   receiving a consumer request for verification of the bottle of product bearing the NFC inlay;
   sending a query to a block chain to verify a match between the NFT and NFC inlay to a valid unique blockchain hash; and
   issuing a consumer verification response to the consumer, wherein the consumer verification response affirms authenticity of the bottle of product to the consumer if the NFT and NFC inlay are a valid match to the unique blockchain hash, and wherein the consumer verification response indicates inauthenticity of the bottle of product to the consumer otherwise.

19. The system of claim 17, wherein the method further includes:
   appending to a ledger entry associated with the unique blockchain hash upon receiving the consumer request for verification of the bottle of product, wherein appending to the ledger includes appending to the ledger entry geographic location corresponding to location from which the consumer request for verification is received, time of receipt of the consumer request for verification;
   receiving a signal indicative of breaking a frangible disconnect of a physical system for authenticating bottled goods; and
   permanently editing the ledger entry associated with the unique blockchain hash to indicate consumption of the bottle of product.

20. The system as recited in claim 17, wherein the method further includes:
   receiving a request for commercial verification from a commercial actor and
   issuing a commercial verification response to the commercial actor, wherein the commercial verification response affirms the authenticity of the bottle of product to the commercial actor if the request for commercial verification includes a valid match to the unique blockchain hash, and wherein the commercial verification response indicates inauthenticity of the bottle of product to the commercial actor if the request for commercial verification fails to include a valid match to the unique blockchain hash.

21. The system as recited in claim 19, wherein the method further includes,
   Appending to a ledger entry associated with the unique blockchain hash upon receiving the request for commercial verification, wherein appending to the ledger entry includes appending to the ledger entry geographic location corresponding to location from which the request for commercial verification is received, time of receipt of the request for commercial verification;
   receiving a signal indicative of breaking a frangible disconnect of a physical system for authenticating bottled goods; and
   permanently editing the ledger entry associated with the unique blockchain hash to indicate consumption of the bottle of product.

* * * * *